US012171324B2

(12) United States Patent
Sullivan

(10) Patent No.: US 12,171,324 B2
(45) Date of Patent: Dec. 24, 2024

(54) ELECTRONIC DEVICE SUPPORTING BELT ATTACHMENT AND SYSTEM

(71) Applicant: Christopher Dean Sullivan, Pittsburgh, PA (US)

(72) Inventor: Christopher Dean Sullivan, Pittsburgh, PA (US)

(*) Notice: Subject to any disclaimer, the term of this patent is extended or adjusted under 35 U.S.C. 154(b) by 138 days.

(21) Appl. No.: 17/985,314

(22) Filed: Nov. 11, 2022

(65) Prior Publication Data

US 2023/0075238 A1    Mar. 9, 2023

Related U.S. Application Data

(63) Continuation-in-part of application No. 17/346,578, filed on Jun. 14, 2021, now Pat. No. 11,528,986.

(60) Provisional application No. 63/038,958, filed on Jun. 15, 2020.

(51) Int. Cl.
    *A45F 5/02* (2006.01)
(52) U.S. Cl.
    CPC .................... *A45F 5/021* (2013.01)
(58) Field of Classification Search
    CPC ....... F16M 13/04; F16M 11/041; A45F 5/021; A45F 2200/0508; A45F 2200/0516; A45F 2200/0525
    USPC .................................................. 224/678, 185
    See application file for complete search history.

(56) References Cited

U.S. PATENT DOCUMENTS

| 5,528,846 A * | 6/1996 | Baggett ................. F16M 13/00 224/913 |
| 5,743,451 A * | 4/1998 | Kahn ...................... A45F 5/021 224/904 |
| 8,733,603 B2 * | 5/2014 | Tages ..................... F16M 13/00 248/223.41 |
| 8,763,297 B2 * | 7/2014 | Boll ....................... F41A 23/04 42/94 |
| 9,405,172 B2 * | 8/2016 | Cunningham, III ... F16M 13/04 |
| 10,159,329 B1 * | 12/2018 | Lang ....................... A45F 3/005 |
| 2009/0001117 A1 * | 1/2009 | Rassias ................. F41G 11/001 224/192 |
| 2010/0294822 A1 * | 11/2010 | Haight .................. F41C 33/041 224/666 |
| 2016/0182698 A1 * | 6/2016 | Gordon ................... H04M 1/04 455/575.6 |
| 2018/0295975 A1 * | 10/2018 | Washington ........... A45F 5/021 |

* cited by examiner

*Primary Examiner* — Adam J Waggenspack
(74) *Attorney, Agent, or Firm* — David G. Oberdick; Chiara F. Orsini

(57) ABSTRACT

The present invention is directed to a device, system and method of attaching an electronic device to a belt, and to a belt having an attached electronic device, that will sit away from the user's body when in use and will be held close to the user's body when not in use. The various embodiments of the present invention also enable the easy transition of the electronic device from the in-use position to the stored position and vice versa. One embodiment of the present invention utilizes two belt clips and a gooseneck electronic device holder to achieve these goals.

8 Claims, 13 Drawing Sheets

ELECTRONIC DEVICE SUPPORTING BELT ATTACHMENT AND SYSTEM

CROSS-REFERENCE TO RELATED APPLICATION

This application is a Continuation-in-Part Application claiming priority to U.S. Non-Provisional application Ser. No. 17/346,578, filed on Jun. 14, 2021, which claims priority to U.S. Provisional Application Ser. No. 63/038,958, filed Jun. 15, 2020, both of which are incorporated by reference herein in their entirety.

BACKGROUND OF THE INVENTION

Field of the Invention

The present invention relates to electronic device holders, and more particularly, to hands-free holders for electronic devices such as smart phones, tablets, mobile telephones, personal digital assistants, mobile devices, etc. (collectively referred to herein as "device(s)"), which allow the user to connect a device to a belt and to have the device held away from the body when in use and close to the body when not in use.

Background

Electronic devices are carried and used by many people today for both work and leisure. Because of their portability and usefulness, people in many different industries use portable electronic devices while on the job. In many professions, a person needs to be able to view his or her electronic device while performing various duties. This can present challenges in those jobs and industries where the work involves physical labor and/or the use of one's hands. In those situations, it can be difficult to hold an electronic device while working. Similarly, continuously stowing and removing an electronic device from one's pocket, belt, bag, etc. is inefficient and can increase the likelihood that the device will be dropped.

There are many technologies on the market today that attempt to address this problem with various electronic device holders. Some of those device holders utilize a flexible gooseneck mechanism or structure, which allows the phone to be held away from the user's body so that it is easier to see the phone without having to hold it in one's hands. One drawback of many of the existing technologies though, is that they lack a simple way to move the electronic device into a secure or close-to-the-body position when the user does not need to see it and, particularly when the user is moving.

For example, U.S. patent application Ser. No. 14/577,883 entitled Hand-Free Electronic Device Holder discloses a belt with a gooseneck attachment for holding a cell phone. The structure of the belt is different from the present invention in several ways, including but not limited to, the fact that the invention in Ser. No. 14/577,883 does not have a structure to hold the gooseneck and the phone closer to the body nor in a fixed position when not in use.

U.S. Pat. No. 10,159,329 entitled Side Arm discloses a hands-free mounting apparatus that has at least three rotational degrees of freedom. This invention provides for a mobile/adjustable belt-worn support device that could be moved into a position that is close to the body or away from the body. However, the design of this apparatus is significantly more cumbersome than the current invention and it does not allow for close-to-the-body, unobtrusive storing and wearing of the electronic device when not in use.

Overall, the technologies currently on the market have several shortcomings. Some do not allow for the secure, hands-free holding of the phone away from the body in a manner that enables the user to view the device without holding it in his/her hands. Some existing technologies utilize a gooseneck structure but do not enable the user to move the electronic device into a stored or fixed position that is secure, close to the body, and easily accessible. Still other technologies do not provide a mechanism for securing the stored electronic device in a manner to enable the user to move around while the device remains attached to his/her belt and not in use. The present invention solves all of these difficulties by providing an electronic device belt holder that: (1) securely holds the electronic device away from the user's body when the device needs to be viewed; (2) holds the device close to the user's body when the device does not need to be viewed; (3) secures the device and the gooseneck structure to the belt with a simple design that keeps the device in the stored and fixed position while the user moves; and (4) is designed to enable an easy transition of the device from the stored or stowed position to the in-use position.

BRIEF SUMMARY OF THE INVENTION

One embodiment of the present invention is a gooseneck belt clip that has a front plate, a back plate connected to the front plate and a gooseneck. The gooseneck of this embodiment has a base at one end that connects to the front plate and an inflexible portion adjacent to the base. The inflexible portion includes an angled portion such that the angled portion and the inflexible portion stabilize the gooseneck. This embodiment also has an electronic device holder attached to the end of the gooseneck opposite the base.

Another embodiment of the present invention is a stowing belt clip having a front plate, a back plate connected to the front plate and a rest attached to the front plate, which rest is designed to securely hold a gooseneck close to the front plate when the gooseneck is in a stowed position.

An additional embodiment of the present invention is a stowing gooseneck belt clip. The stowing gooseneck belt clip of this embodiment has a front plate, a back plate connected to the front plate, a flexible gooseneck with a base at a first end and a second end opposite the base, with the gooseneck connected at the base to the front plate. In this additional embodiment, the gooseneck has an inflexible portion adjacent to the base and that includes an angled portion such that the angled portion and the inflexible portion stabilize the gooseneck, and wherein the gooseneck moves near the base to transition from an in-use position to a stowed position. The stowing gooseneck belt clip further comprises an electronic device holder attached to the second end of the gooseneck opposite the base and configured to detachably hold an electronic device, and a rest attached to the front plate and laterally adjacent to the flexible gooseneck, which rest is designed to securely hold the gooseneck close to the front plate when the gooseneck is in a stowed position.

BRIEF DESCRIPTION OF THE SEVERAL VIEWS OF THE DRAWINGS

For the purpose of facilitating understanding of the invention, the accompanying drawings and description illustrate preferred embodiments thereof, from which the invention, various embodiments of its structures, construction and method of operation, and many advantages, may be understood and appreciated.

DETAILED DESCRIPTION OF THE INVENTION

The present invention will be understood more readily by reference to the following detailed description of the invention and the accompanying figures, which form a part of this disclosure. This invention is not limited to the specific devices, methods, processes, elements or parameters described and/or shown herein and the terminology used herein is for the purpose of describing particular embodiments and is by way of example only and not intended to be limiting of the claimed invention. Any and all patents and other publications identified in this specification are incorporated by reference as though fully set forth herein. The following detailed descriptions should not be taken in a limiting sense. The accompanying figures and drawings are hereby incorporated by reference.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

For purposes of the description hereinafter, the terms "upper", "lower", "right", "left", "vertical", "horizontal", "top", "bottom", "lateral", "longitudinal", and derivatives thereof shall relate to the invention as it is oriented in the figures. However, it is to be understood that the invention may assume alternative variations and step sequences, except where expressly specified to the contrary. It also is to be understood that the specific devices and processes illustrated in the attached drawings and described in this specification are simply exemplary embodiments of the invention. Hence, specific dimensions and other physical characteristics related to the embodiments disclosed herein are not to be considered as limiting.

While the disclosure has been described in detail and with reference to specific embodiments thereof, it will be apparent to one skilled in the art that various changes and modifications can be made thereto without departing from the spirit and scope of the embodiments. Thus, it is intended that this application covers modifications and variations of this disclosure provided they come within the scope of the appended claims and their equivalents.

Figure 1:
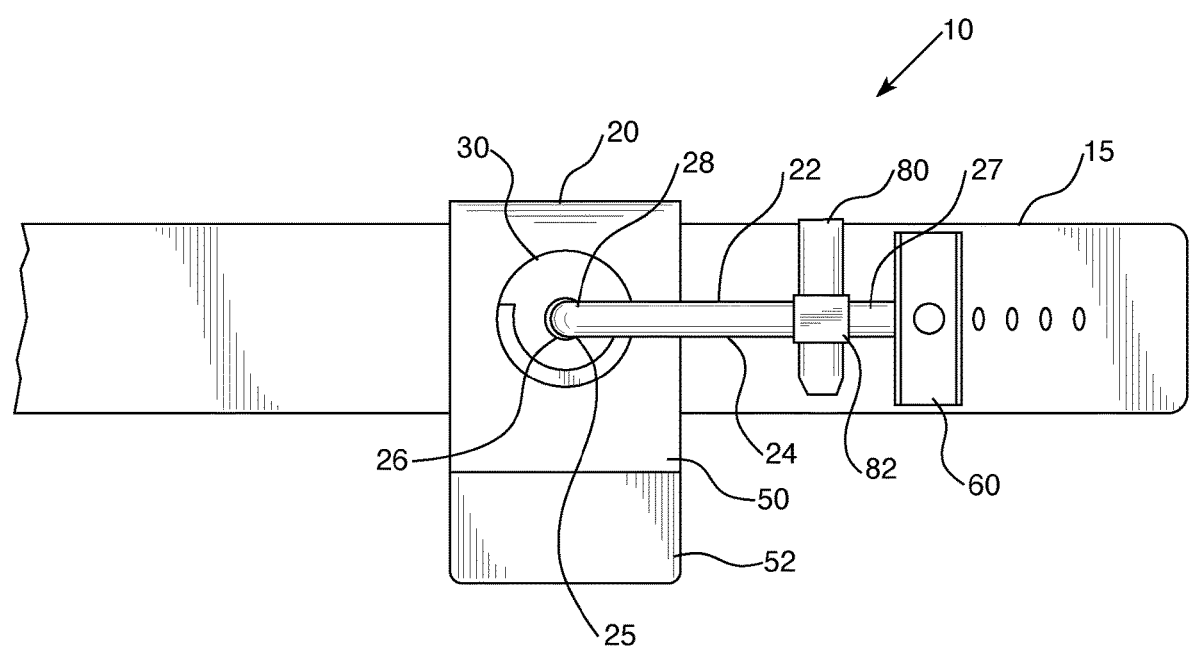
FIG. 1 is a front view of one embodiment of the present invention having two belt clips attached to a belt and a gooseneck device holder in the stored position.

The present invention is directed to various belt clips and to systems of attaching a portable electronic device 12 to a belt 15 and is directed to a belt 15 having an attached portable electronic device 12, that will sit away from the user's body when in use and will be held close to the user's body and/or in a fixed position when not in use. One such example of these clips and a system is shown in FIG. 1. The closed/fixed position is referred to herein interchangeably as the "stored" position and/or the "stowed" position. The various embodiments of the present invention also enable the easy transition of the electronic device 12 from the in-use position to the stored or stowed position and vice versa. The phrases "electronic device" and "device" are used herein to encompass any portable electronic device of any size that can be support by the present invention including but not limited to personal communication devices such as smart phones, tablet computers, media players, e-readers, personal digital assistants, gaming and entertainment devices, data collection and monitoring devices, inventory management and point-of-sale devices, wearable computers, pagers, cellular telephones, radios, etc.

The present invention includes a variety of individual electronic device belt clips and systems that include at least two belt clips. More specifically, the present invention system 10 includes one gooseneck belt clip 20 and at least one stowing belt clip 80 that connect to a user's belt 15 to allow an electronic device 12 to be viewed without needing to be held in the user's hands and to be securely stowed when not in use or when the electronic device 12 does not need to be in a position that is away from the user's body. The present invention encompasses a variety of structures for the gooseneck belt clip 20 and the stowing belt clip 80 that can be used interchangeably with one another to create a wide variety of systems according to the user's preferences. Additionally, another embodiment of the present invention encompasses a system 10 of at least two belt clips, according to the designs detailed herein, and a belt 15. Examples of systems according to the present invention are illustrated in FIGS. 1, 2, and 5.

Figure 2:
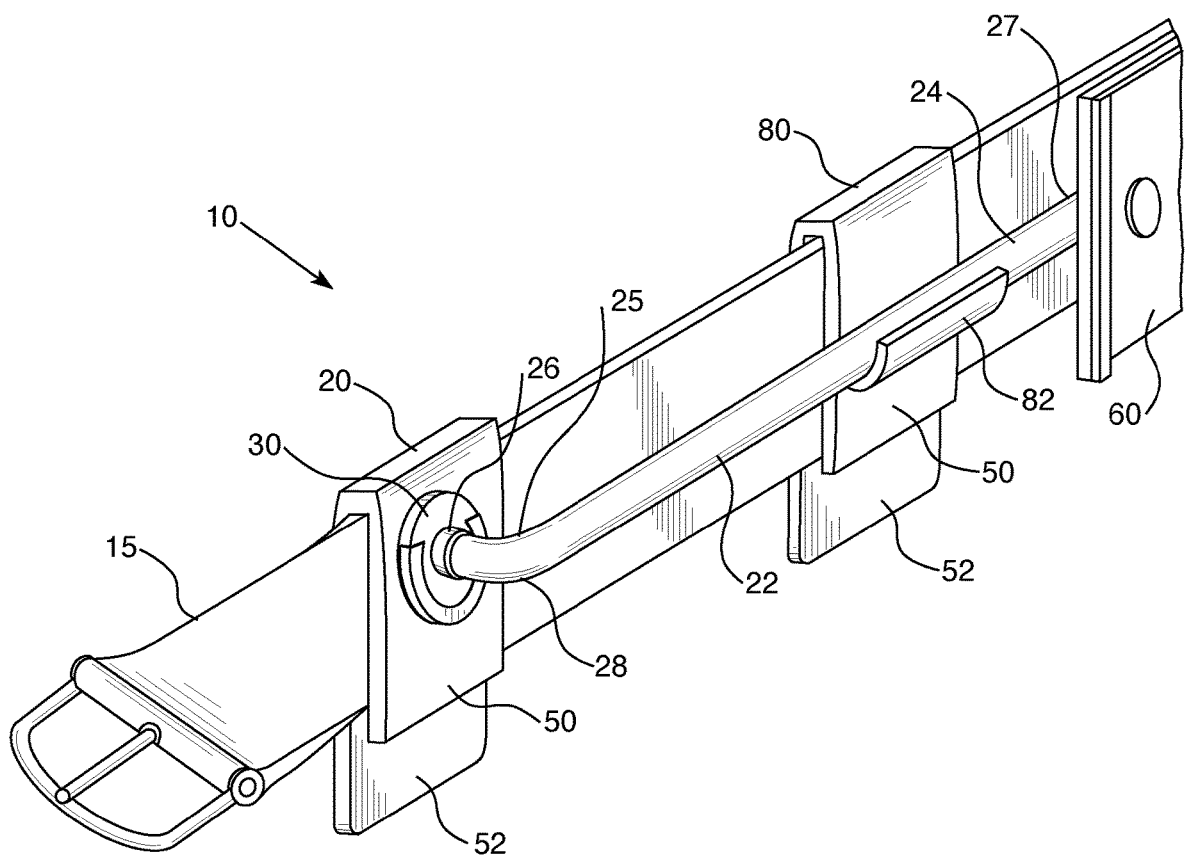
FIG. 2 is perspective view of one embodiment of the present invention.
Figure 4:
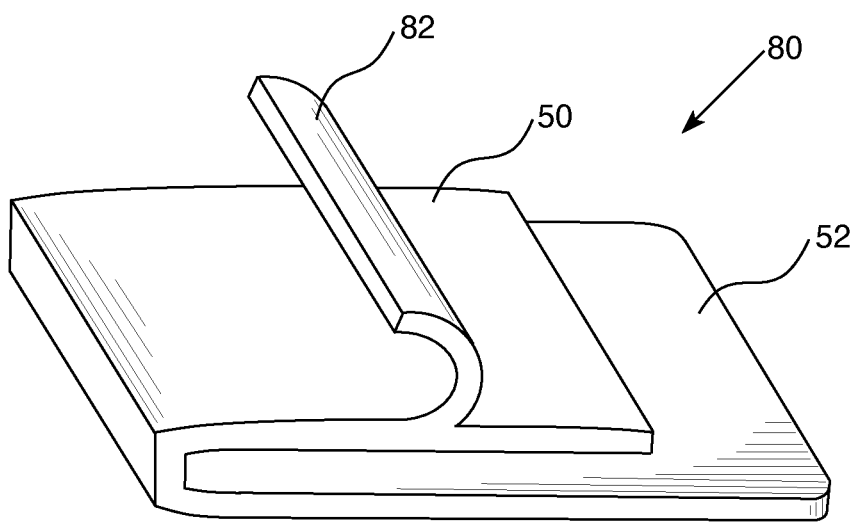
FIG. 4 shows one embodiment of a stowing belt clip according to one embodiment of the present invention have a semicylindrical rest for the gooseneck device holder.
Figure 5:
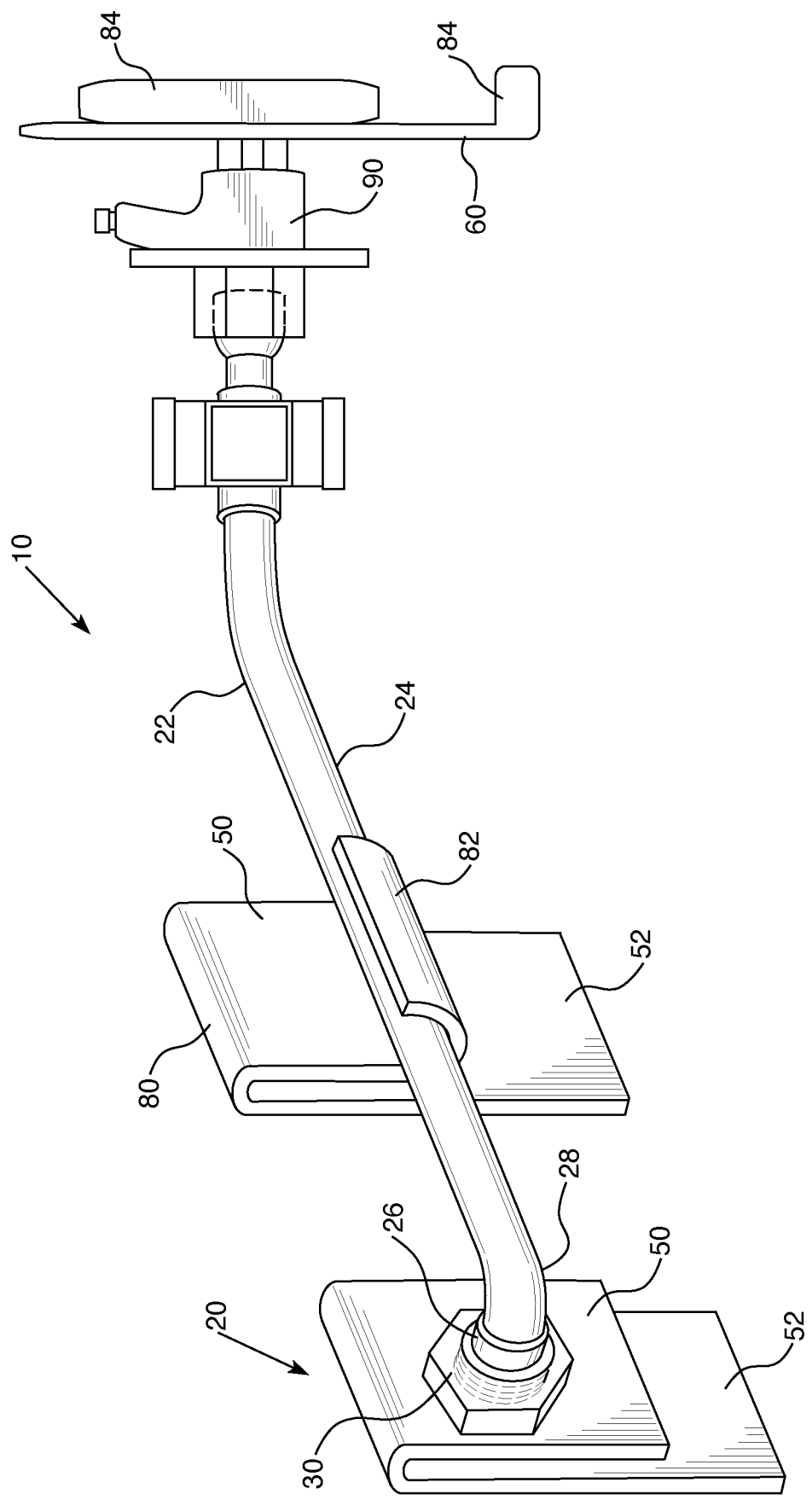
FIG. 5 shows one embodiment of the present invention having a gooseneck belt clip and a stowing belt clip.
Figure 6:
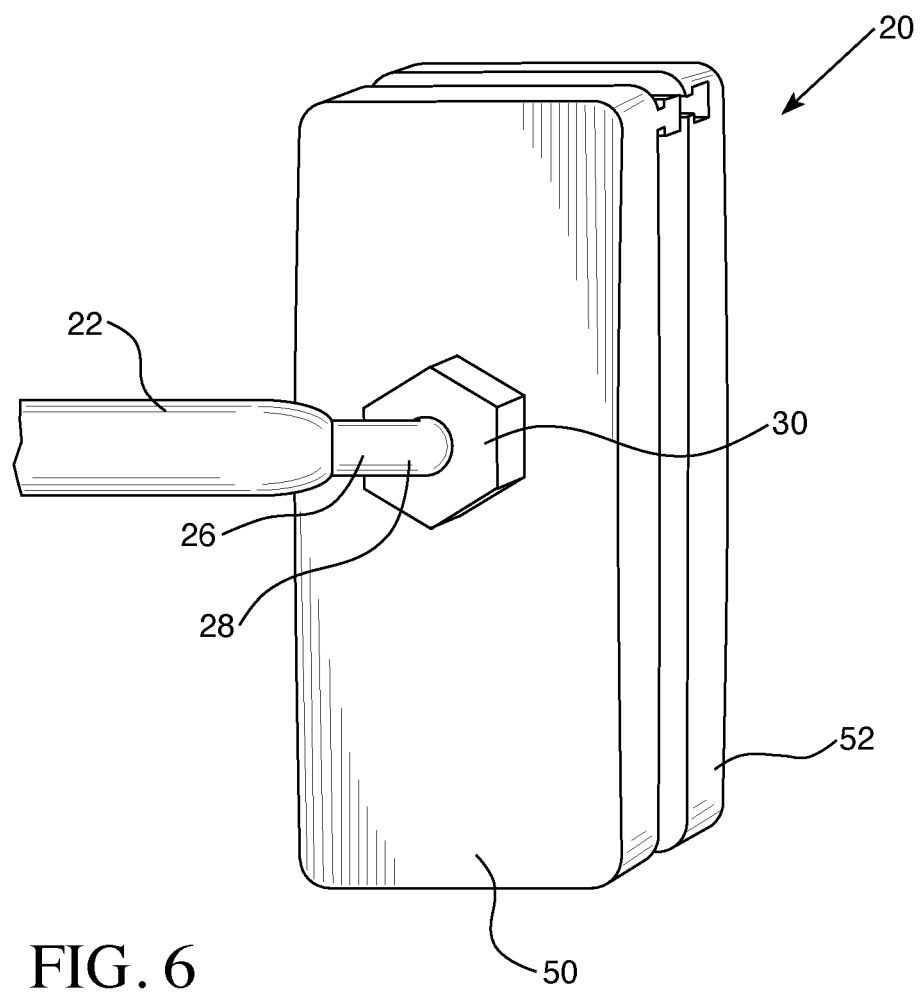
FIG. 6 is a front view of one embodiment of a gooseneck belt clip according to the present invention.
Figure 7:
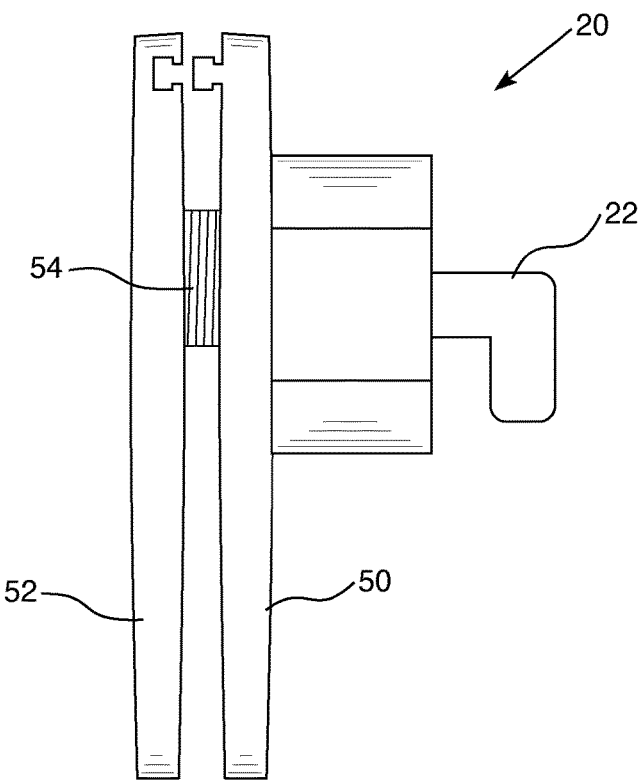
FIG. 7 is a side view of one embodiment of a gooseneck belt clip according to the present invention.
Figure 8:
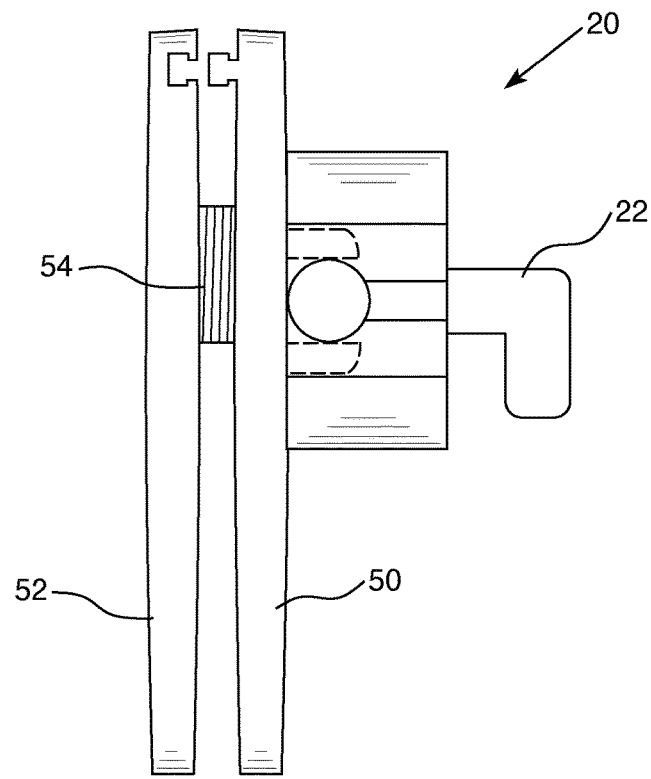
FIG. 8 is another view of the belt clip of FIG. 7 with a cross-sectional view of the base and tightening screw.
Figure 9:
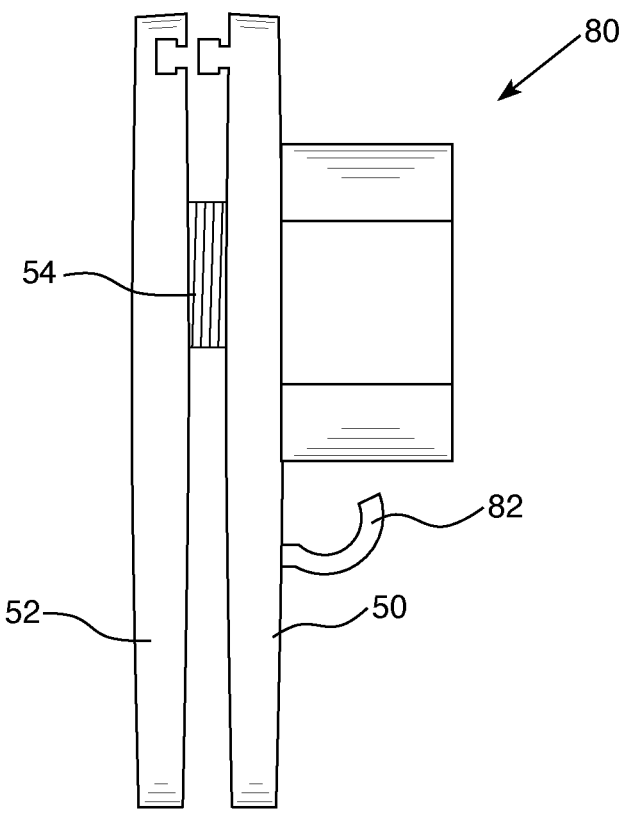
FIG. 9 is a side view of one embodiment of a stowing belt clip according to the present invention.
Figure 10:
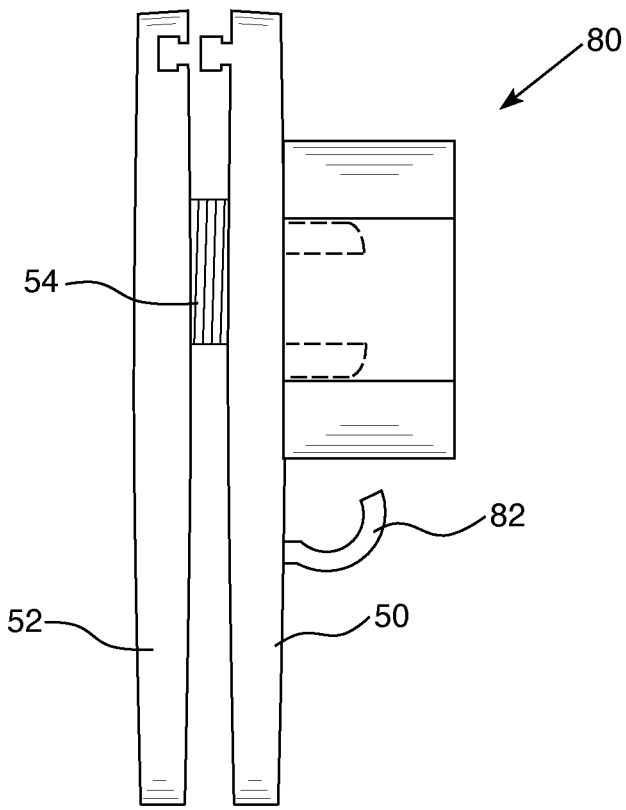
FIG. 10 is another view of the clip of FIG. 9 with a cross-sectional view of the tightening screw.
Figure 11:
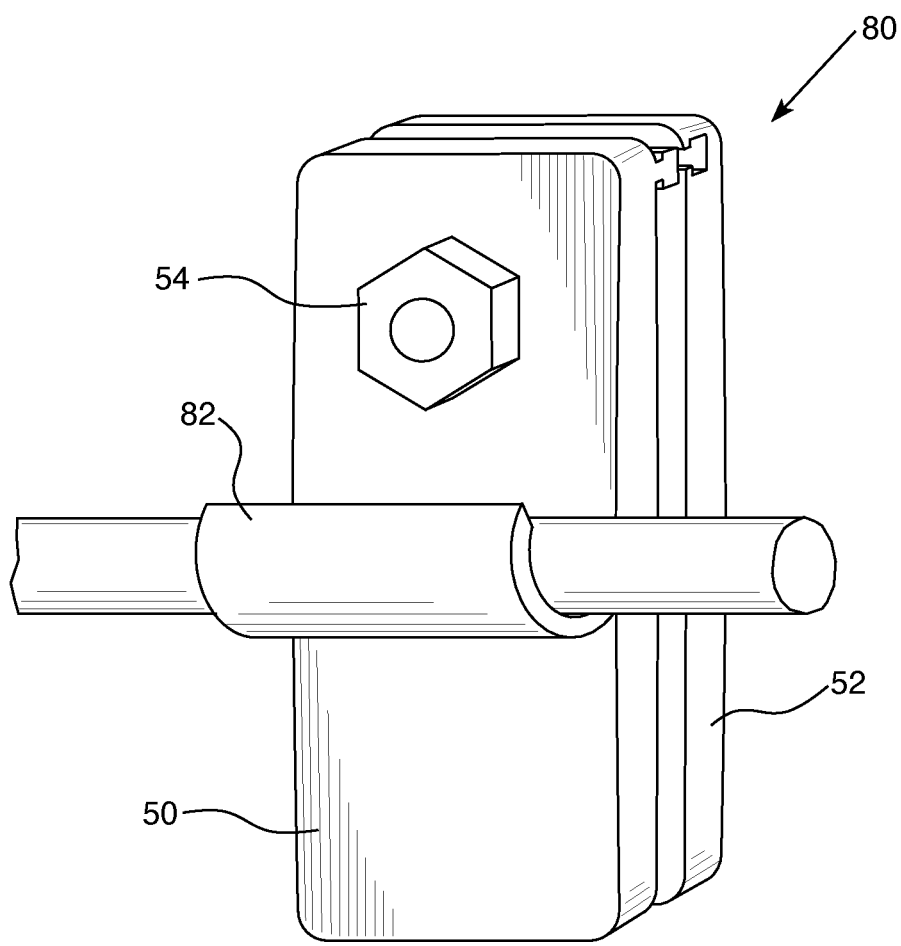
FIG. 11 is a front view of one embodiment of a stowing clip according to the present invention.

One embodiment of the present invention is an electronic device support system 10 having a gooseneck belt clip 20 and at least one stowing belt clip 80 as shown in FIGS. 1, 2 and 5. In this embodiment of the present invention, the gooseneck belt clip 20 and the stowing belt clip(s) 80 individually are predominately one-piece clips comprised of a front plate 50 and a back plate 52 (as shown in detail in FIGS. 3 and 4). Both belt clips are of this embodiment are designed to slide over a belt 15, as shown in FIG. 2. In a preferred embodiment of the preset invention, each of the clips 20 and 80 resemble an inverted "U" shape with the back plate 52 of each clip being slightly longer than the front plate 50 to aid in bracing and stabilizing the extended gooseneck 22 and the attached electronic device 12 (also illustrated in FIGS. 3 and 4). In other embodiments, clips 20 and 80 can have other configurations and/or means for interaction between front plate 50 and back plate 52 and for connection to the belt 15.

For example, but without limitation, another embodiment of the present invention is shown in FIGS. 6 through 11. This embodiment is a system 10 and device(s) having a gooseneck belt clip 20 and at least one stowing belt clip 80 that have front plates 50 and back plates 52 that are separate pieces (shown in more detail in FIGS. 7 through 10). For these two-piece clips, a tightening screw 54 (shown in FIG. 7 through 11) is used to tighten the front plate 50 to the back plate 52 or vice versa (and to decrease the distance between the two plates) to secure the clips to the user's belt 15. These two-piece clips slide over a user's belt 15 up to the point of the tightening screw 54. Additionally, tightening screws 54 could be used with the one-piece clips of the previous embodiment, but care would need to be taken to avoid over-tightening the clips and, thereby, snapping the one-piece clips into two pieces. One skilled in the art will understand that there are a variety of similar tightening mechanisms that can be substituted for the tightening screw 54 and all such equivalent mechanisms are included within the scope of this invention.

The gooseneck belt clips 20 and the stowing belt clips 80 of the present invention optionally may have a variety of features and designs and remain within the scope of the present invention. However, each belt clip shares a basic purpose that the variety of designs accomplish. The gooseneck belt clip 20 allows the electronic device 12 to sit away from the user's body (in an in-use or open position) and to be seen and securely supported without the use of the user's hands. To accomplish this purpose, the gooseneck 22 has an angled portion 28 near where the gooseneck 22 connects to the base 30 (shown in FIGS. 1 through 3, 5 and 6) that can be adjusted to the user's preferred angle and position or it can be set by the manufacturer to a specific angle. This angled portion 28 is encompassed by an inflexible portion 26 of the gooseneck 22 (see FIG. 3). The gooseneck 22 has its base 30 at a first end 25 near the base 30 and a second end 27 opposite the base 30 (FIGS. 1 and 2). The gooseneck 22 is connected at the base 30 to the front plate 50. The gooseneck 22 has an inflexible portion 26 adjacent to the base 30. The inflexible portion 26 includes an angled portion 28 such that the angled portion 28 and the inflexible portion 26 stabilize the gooseneck 22 and wherein the gooseneck 22 moves near the base 30 to transition from an in-use position to a stowed position.

Figure 3:
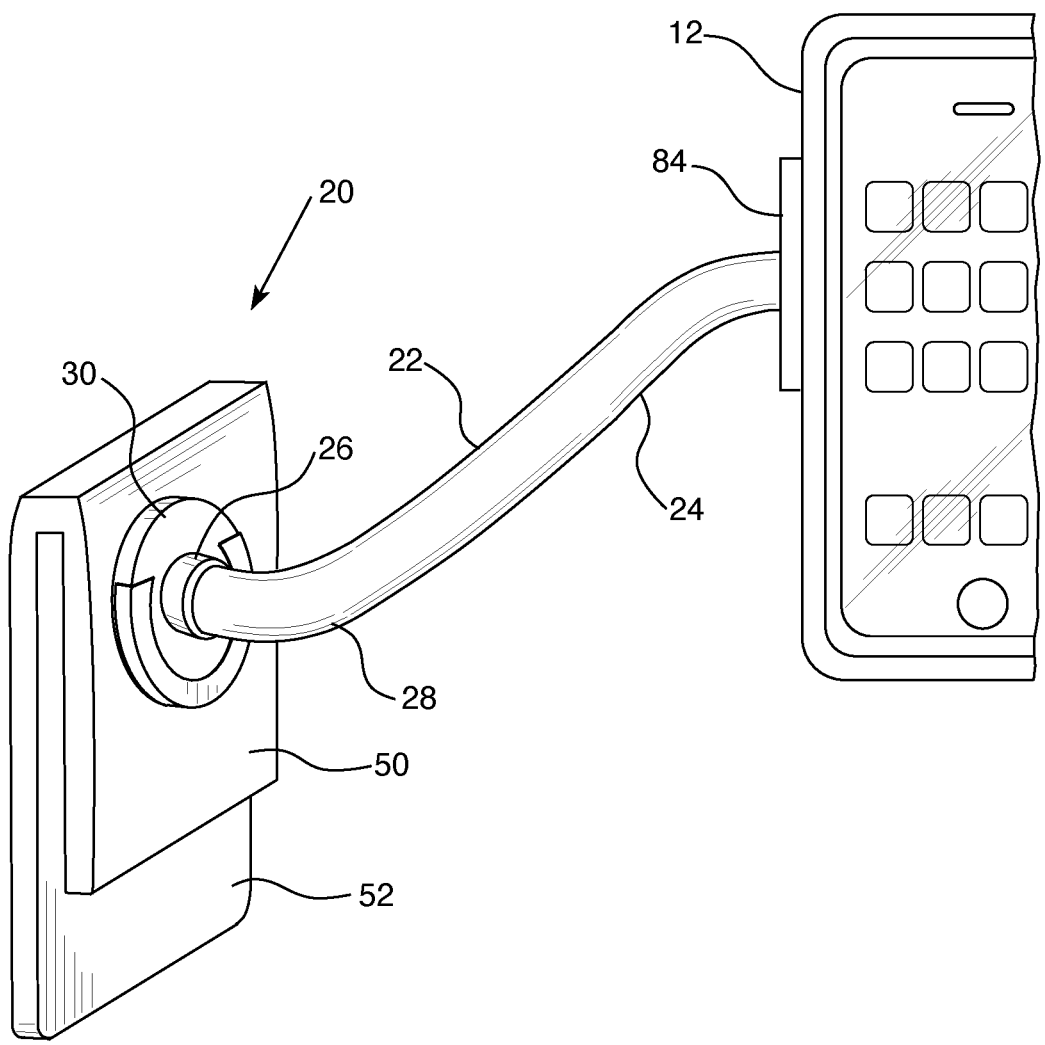
FIG. 3 shows one embodiment of a gooseneck belt clip according to the present invention.

One end of the inflexible portion 26 is attached to a base 30, which is secured to the front plate 50 of the gooseneck belt clip 20 (shown in FIGS. 1 through 3 and 6). The opposite end of the inflexible portion 26 is attached to or transitions to become a more flexible portion 24 of the gooseneck 22 (as shown in FIG. 3). The inflexible portion 26 of the gooseneck 22 accomplishes two primary functions, among others. First, inflexible portion 26 operates to stabilize and orient the flexible portion 24 of the gooseneck 22 and the electronic device holder 60 (and thereby, the electronic device 12) so that the electronic device 12 remains positioned (either horizontally or vertically) with the top of the screen up and the bottom of the screen down. The inflexible portion 26 also holds the device away from the user's body while minimizing the tendency of a device to flop around at the end of the gooseneck 22.

For some embodiments of the present invention, the entire gooseneck 22 may be inflexible and remain in a relatively static position when away from the user's body, with the inflexible portion 26 extending from the base 30 to the electronic device holder 60. For other embodiments of the present invention, the gooseneck 22 may have an inflexible portion 26 adjacent to the base 30, and encompassing the angled portion 28, and a flexible portion 24 that extends from the inflexible portion 26 (beyond the angled portion 28) to point of connection with the electronic device holder 60. One of the benefits to having a flexible portion 24 of the gooseneck 22 is that it will enable the user to modify the position and orientation of the electronic device holder 60 and the electronic device 12 while the electronic device 12 is held away from the body. For some embodiments of the present invention, the gooseneck 22 may telescope or lengthen and for other embodiments the gooseneck 22 may have a set or static length. The inflexible portion 26 can be designed to have a 360-degree range of movement at the point where it connects to the base 30 when not in the stowed position. A nut or similar structure can lock or secure the inflexible portion 26 and the gooseneck 22 in the position of the user's choice. The inflexible portion 26 remains at about a 90-degree angle regardless of the position of the gooseneck 22 and also keeps the inflexible portion 26 close to the body.

In the various embodiments of the present invention, the front plate 50 and back plate 52 may be the same length or different lengths depending upon the rest of the structure of the clip, how the clip attaches to the belt 15, the length and weight of the gooseneck 22, the weight and size of the device 12, etc. For example, one-piece clips, as shown in FIGS. 1 through 5, that do not utilize a tightening screw 54, benefit from having a back plate 52 that is longer than the front plate 50 and, preferably, extends below the belt 15. This structure provides additional support and stability for the gooseneck 22, the electronic device holder 60 and the electronic device 12. In some embodiments of the present invention clips, the front plate 50 optionally can curve under the lower edge of the belt 15 a bit to help secure the clip to the belt 15. For embodiments of the present invention clips that utilize tightening screws 54 the front plate 50 and back plate 52 may be the same length or different lengths. Also, in a preferred embodiment of the present invention, all belt clips are movable or positionable along the length of the belt 15 to enable the user to position the electronic device 12 and belt clips anywhere along the belt 15.

It will be obvious to one skilled in the art that there are a variety of different mechanisms and structures that can be used to secure the gooseneck 22 to the front plate 50 of the gooseneck belt clip 20. One possible structure, as shown in FIGS. 2, 3 and 5 through 8, has a base 30 attached to the inflexible portion 26 of the gooseneck 22, which base 30 then securely attaches to the front plate 50 of the gooseneck belt clip 20. In one embodiment of the present invention, the base 30 may be removably attached to the front plate 50 of the gooseneck belt clip 20. In another embodiment of the present invention, the base 30 will be permanently attached to the front plate 50 of the gooseneck belt clip 20. In all embodiments of the present invention, the gooseneck 22 needs to be able to rotate, pivot or move at its connection to the base 30 to enable the gooseneck 22 to move between the in-use and the stowed positions.

Figure 13:
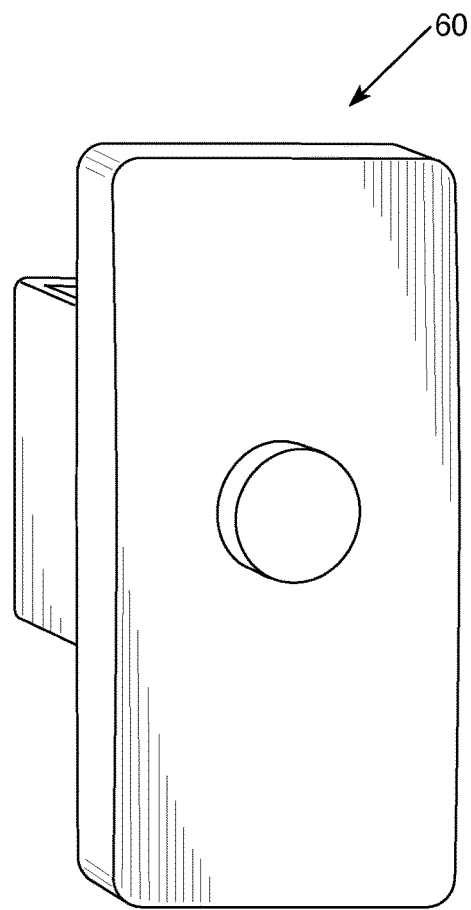
FIG. 13 is a back view of one embodiment of an electronic device holder according to the present invention.
Figure 14:
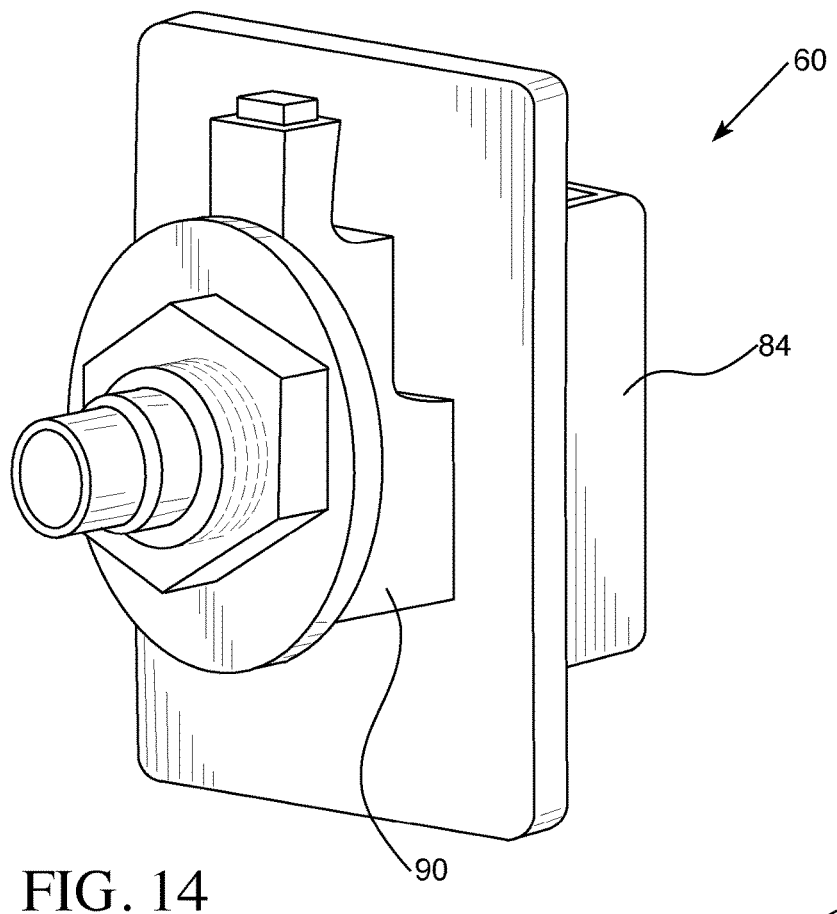
FIG. 14 is another back view of one embodiment of an electronic device holder having a cross-sectional view of the phone release unit.
Figure 15:
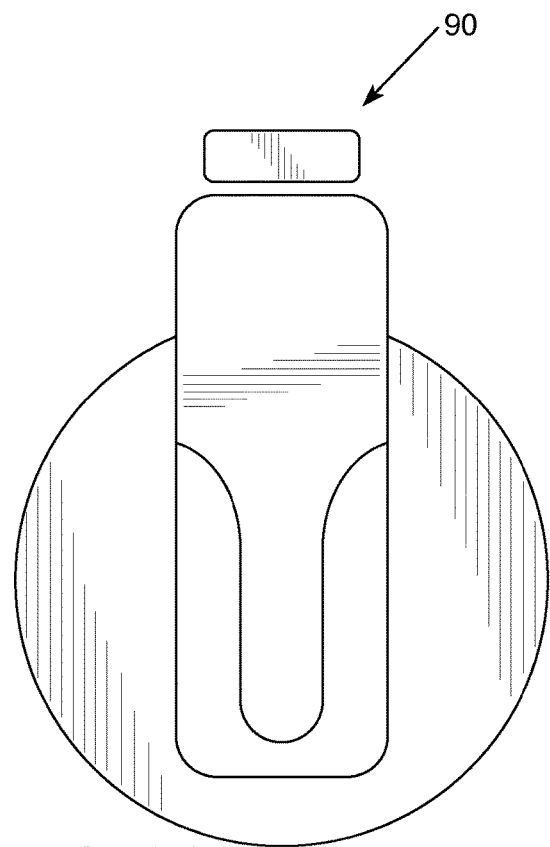
FIG. 15 is a front view of one embodiment of the phone release unit of the present invention.
Figure 16:
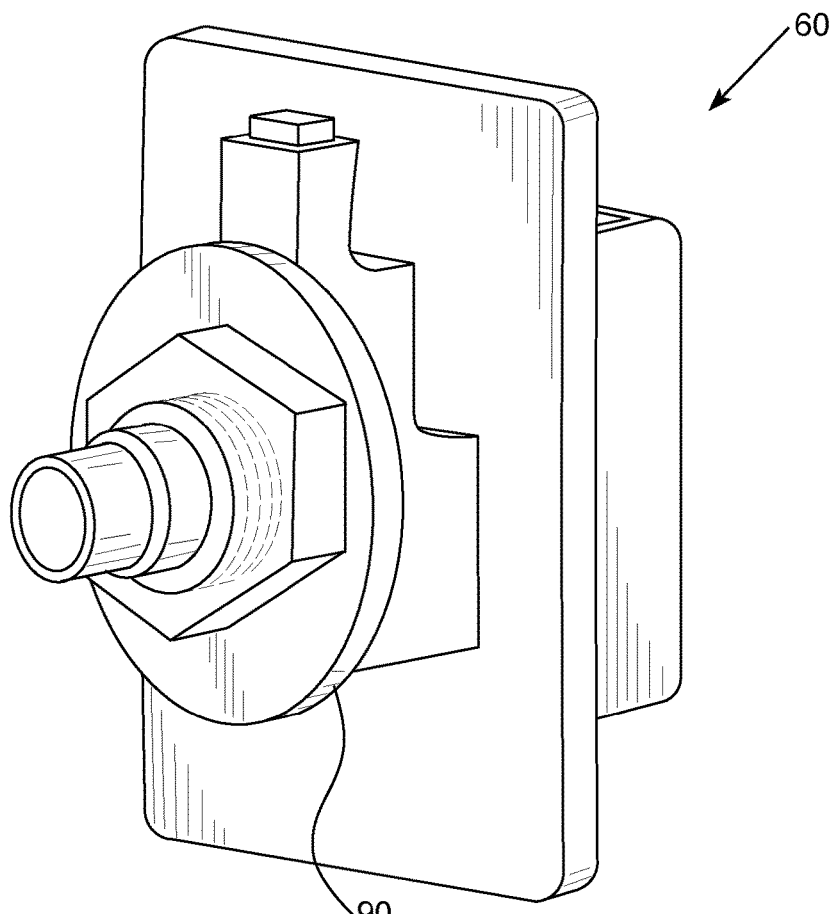
FIG. 16 is a back view of one embodiment of the phone release unit according to the present invention.

According to the present invention, the gooseneck belt clip 20 is designed to support an electronic device holder 60. A variety of electronic device holder 60 structures are shown in FIGS. 1 to 3, 5, and 12 through 17. One embodiment of the present invention comprises an electronic device holder 60 which removably attaches to an electronic device 12 and which removable attaches to a holder release unit 90. The holder release unit 90 enables the user to quickly release the electronic device 12 while the device 12 remains attached to the device holder 60. The goal of this embodiment is to enable the quick release of the electronic device 12 from the gooseneck 22 and the quick attachment of the electronic device 12 to the gooseneck 22, which may be particularly useful in certain environments. In some embodiments of the present invention, the device holder 60 may be adjustable to accommodate devices 12 of different sizes. Thus, attaching an electronic device 12 to an adjustable device holder 60 securely may take a bit of time to get the device 12 securely in the holder 60 and to adjust the holder 60. In certain circumstances it may be desirable to have quick release functionality so that the electronic device 12 can be connected and disconnected from the gooseneck belt clip 20 without having to lose time adjusting the device holder 60. To accomplish this, the holder release unit 90 releases the device 12 and the holder 60 and enables them to reconnect without having to adjust the device 12 in the holder 60 each time. Examples of a holder release units 90 are shown in FIGS. 5, 14 and 16.

Figure 17:
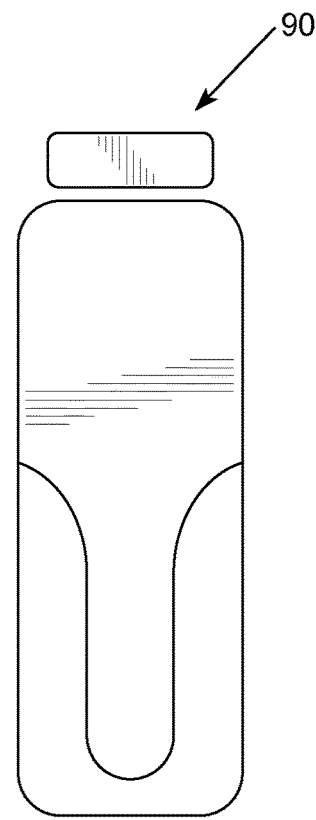
FIG. 17 is another view of a phone release unit according to the present invention.

As shown in FIG. 5, the gooseneck 22 attaches to a holder release unit 90 at the gooseneck's end opposite the base 30. It will be obvious to one skilled in the art that there are many different ways to connect the gooseneck 22 to the holder release unit 90. One possible mechanism is by use of a lock nut, as shown in FIG. 5. FIGS. 14 and 16 illustrate in cross-sectional detail one possible structure of this lock nut connection point between the gooseneck 22 and the holder release unit 90. FIGS. 13, 15 and 17 illustrate possible structures for the front of the holder release unit 90 and its point of connection to the electronic device holder 60. Additionally, FIG. 5 shows a side view of the connection between the electronic device holder 60 and the holder release unit 90.

Figure 12:
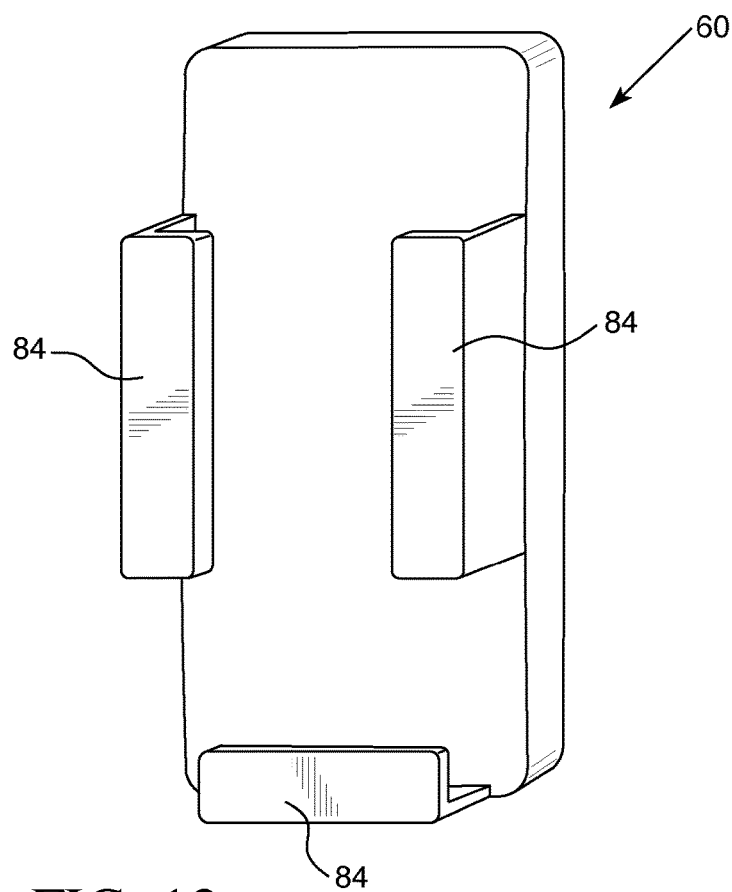
FIG. 12 is a front view of one embodiment of an electronic device holder according to the present invention.

One embodiment of an electronic device holder 60 according to the present invention is shown in FIGS. 5 and 12. For this embodiment, the electronic device holder 60 has three securing structures 84 that hold the electronic device 12 in place on the electronic device holder 60. These securing structures 84 may be stationary and sized to hold only one type or a variety of electronic devices 12. Alternatively, the securing structures 84 may move or adjust to securely accommodate electronic devices 12 of a wide variety of dimensions. There also can be a combination of stationary and moving securing structures 84 on the same electronic device holder 60.

The electronic device holder 60 may be permanently secured to a holder release unit 90 or permanently secured directly to the gooseneck 22 at its end opposite the base 30. Alternatively, and in the preferred embodiment, the electronic device holder 60 will be removably connected to a holder release unit 90. It will be obvious to one skilled in the art that the holder release unit 90 may use a variety of structures and mechanisms to connect to the electronic device holder 60.

The present invention also comprises a stowing belt clip 80 designed to secure the electronic device holder 60 and the electronic device 12 close to the user's body and/or in a fixed position when the electronic device 12 is not in use. Various embodiments of a stowing belt clip 80 according to the present invention are shown in FIGS. 1, 2, 4, and 5. The stowing belt clip 80 can have the various one-piece and two-piece structures described herein for the gooseneck belt clip 20. Additionally, the stowing belt clip 80 can have the variety of structures for the front plate 50 and back plate 52 described herein for the gooseneck belt clip 20. However, the primary difference between the stowing belt clip 80 and the gooseneck belt clip 20 is that the stowing belt clip 80 has a rest 82 to secure or hold the gooseneck 22 and the electronic device 12 close to the user's body and/or in a fixed position instead of having a gooseneck 22 attached to its front plate 50. The rest 82 can be of any design and structure that will hold the gooseneck 22 close to the stowing belt clip's front plate 50 including the semicircular or curved rest 82 shown in FIGS. 1, 2, 4 and 5.

The various embodiments of the present invention comprise the individual gooseneck belt clip 20 and the stowing belt clip 80. The various embodiments also comprise a system 10 that includes one gooseneck belt clip 20 and at least one stowing belt clip 80. For many users and purposes, the combination of one gooseneck belt clip 20 and one stowing belt clip 80 will suffice. However, another embodiment of the present invention comprises the use of more than one stowing belt clip 80 with one gooseneck belt clip 20. This combination would increase the security of the gooseneck 22 and the electronic device 12 when in the stowed position. Also, the use of longer goosenecks 22 may require more than one stowing belt clip 80 to hold the entire length of the gooseneck 22 and the electronic device holder 60 close to the user's body.

An alternative embodiment of the invention is an electronic device support system 10 having a gooseneck belt clip 20 and at least one stowing belt clip 80 as shown in FIGS. 1 through 5 that connect directly to a user's waistband instead of connecting to a belt 15. It is possible to design and/or use the gooseneck belt clip 20 and at least one stowing belt clip 80 in accordance with the variations and descriptions presented in this application and have them securely connected to and/or supported by a user's waistband. Various connection structures and mechanism that are known in the field could be used to connect to different types of fabrics with different stiffnesses and weight-supporting properties.

Another embodiment of the present invention comprises an electronic device support belt system 10. This embodiment includes a belt 15 sized to wrap around a user's body and made of a flexible material that also can support both the electronic device 12 and at least two belt clips and any other tools that the user may need to store on or from his/her belt 15. The electronic device support belt system 10 according to this embodiment of the present invention includes one gooseneck belt clip 20 and at least one stowing belt clip 80, both according to the designs described herein.

Figure 18:
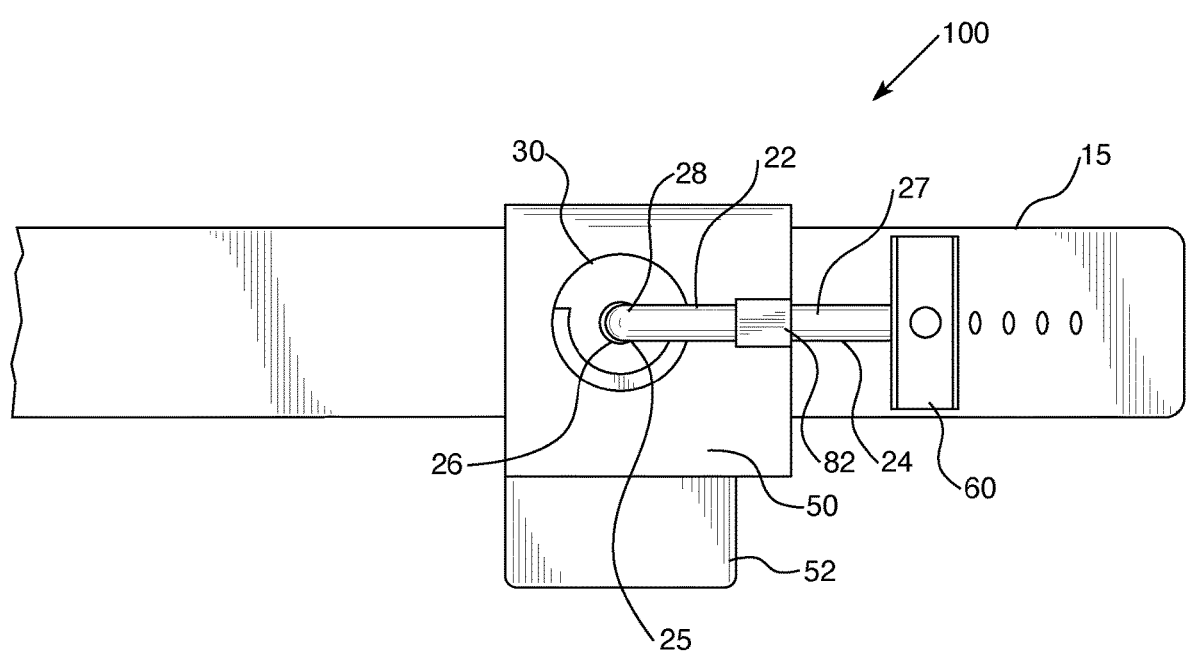
FIG. 18 shows one embodiment of a stowing gooseneck belt clip of the present invention.
Figure 19:
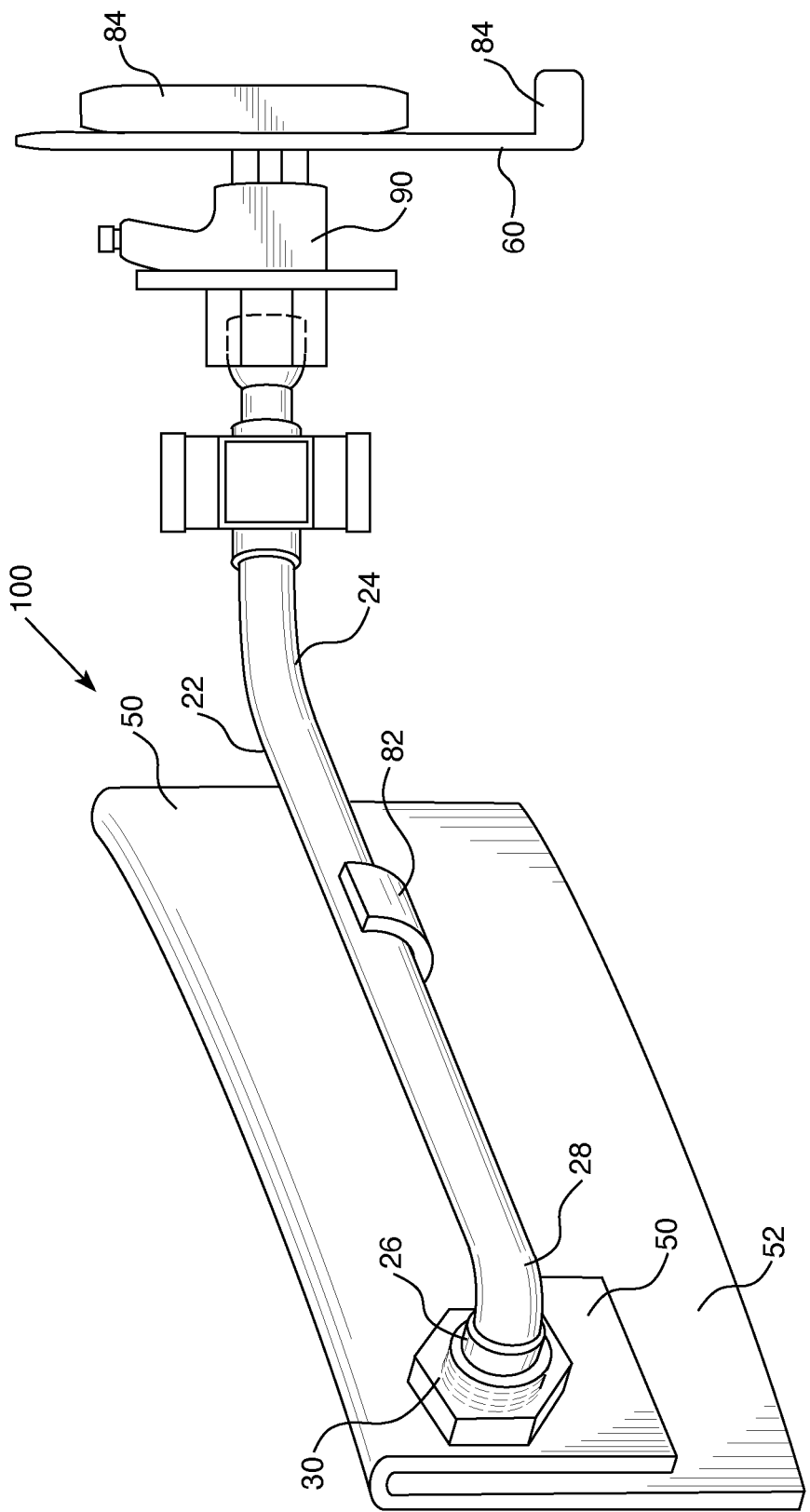
FIG. 19 shows an alternative embodiment of a stowing gooseneck belt clip of the present invention.

Another embodiment of the present invention is a stowing gooseneck belt clip 100 that has certain of the elements of both the gooseneck belt clip 20 and the stowing belt clip 80 incorporated into a single stowing gooseneck belt clip 100. Two nonlimiting example embodiments of this stowing gooseneck belt clip 100 are shown in FIGS. 18 and 19. One embodiment of a stowing gooseneck belt clip 100 of the present invention has a front plate 50 and a back plate 52 connected to the front plate 50 (as shown in FIGS. 18 and 19). The various embodiments of the stowing gooseneck belt clip 100 also can have a flexible gooseneck 22 with a base 30 at a first end 25 and a second end 27 opposite the base 30, and with the gooseneck 22 connected at the base 30 to the front plate 50 (see FIGS. 18 and 19). The gooseneck 22 has an inflexible portion 26 adjacent to the base 30 and which includes an angled portion 28, whereby the angled portion 28 and the inflexible portion 26 stabilize the gooseneck 22. The gooseneck 22 moves near the base 30 to transition from an in-use position to a stowed position. An electronic device holder 60 is attached to the second end 27 of the gooseneck 22 opposite the base 30 and is configured to detachably hold an electronic device. Finally, for these embodiments of a stowing gooseneck belt clip 100, a rest 82 is attached to the front plate 50 and is laterally adjacent to the base 30 of the gooseneck 22. This rest 82 is designed to securely hold the gooseneck 22 close to the front plate 50 when the gooseneck 22 is in a stowed position.

Various embodiments of the stowing gooseneck belt clip 100 can be configured to have all of the alternative structures and designs of the individual gooseneck belt clips 20 and stowing belt clips 80 disclosed herein and shown in FIGS. 1 through 17. For example, the front plate 50 and back plate 52 can be configured to secure around a belt 15, as shown in FIG. 18. Alternatively, one embodiment of the stowing gooseneck belt clip 100 can have the front plate 50 connected to the back plate 52 to form a one-piece inverted U-shape clip that slides onto a belt, as shown in FIG. 19. In some embodiments of the stowing gooseneck belt clip 100, the gooseneck 22 has an adjustable length. In some embodiments, the base 30 of the stowing gooseneck belt clip 100 is removably connected to the front plate 50. Other embodiments of the stowing gooseneck belt clip 100 are designed so that the electronic device holder 60 is removably connected to the second end 27 of the gooseneck 22. Alternative designs have the electronic device holder 60 removably connected to the second end 27 of the gooseneck 22 opposite the base 30 via an electronic device holder release unit 90.

Various embodiments of a stowing gooseneck belt clip 100 of the present invention have a front plate 50 and a back plate 52 of any length that works to support the gooseneck 22 and device holder 60. FIG. 18 illustrates a shorter front plate 50 and back plate 52 that are appropriate for shorter goosenecks 22, lighter or smaller electronic devices, and/or goosenecks 22 made from stronger materials wherein the gooseneck 22 does not require support as close to the device holder 60 to support the electronic device. However, for some embodiments of a stowing gooseneck belt clip 100 a longer front plate 50 and back plate 52 enable the location of the rest 82 closer to the end of the gooseneck 22 that is nearer to the device holder 60 (as shown in FIG. 19). Other embodiments having a longer front plate 50 and back plate 52 can be made from a flexible material that will conform to the belt 15 and to the user's body. Nonlimiting examples of such materials include, leather (faux and real), flexible plastics, silicon rubber, Kevlar®, carbon fiber, and any combination of these materials.

While the disclosure has been described in detail and with reference to specific embodiments thereof, it will be apparent to one skilled in the art that various changes and modifications can be made therein without departing from the spirit and scope of the embodiments. Additionally, while systems of the present invention included descriptions of belt clips, all of those details and variations on clips as part of a system apply to individual clips of the present invention and vice versa. Thus, it is intended that the present disclosure cover all modifications and variations of this disclosure provided they come within the scope of the appended claims and their equivalents. Among other things, the following invention may be embodied as methods or devices. The detailed descriptions of the various embodiments of the present invention should not be taken in a limiting sense.

What is claimed is:

1. A stowing gooseneck belt clip comprising:
a front plate;
a back plate connected to the front plate;
a flexible gooseneck with a base at a first end and a second end opposite the base, the gooseneck connected at the base to the front plate, wherein the gooseneck has an inflexible portion adjacent to the base and wherein the inflexible portion includes an angled portion such that the angled portion and the inflexible portion stabilize the gooseneck and wherein the gooseneck moves near the base to transition from an in-use position to a stowed position;
an electronic device holder attached to the second end of the gooseneck opposite the base and configured to detachably hold an electronic device; and
a semi-circular rest attached to the front plate that opens upwardly and is located horizontally and laterally adjacent to the base of the flexible gooseneck, which rest is designed to securely hold the gooseneck close to the front plate when the gooseneck is in a stowed position.

2. The stowing gooseneck belt clip of claim 1, wherein the front plate and back plate are configured to secure around a belt.

3. The stowing gooseneck belt clip of claim 1, wherein the front plate is connected to the back plates to form a one-piece inverted U-shape clip that slides onto a belt.

4. The stowing gooseneck belt clip of claim 1, wherein the gooseneck has an adjustable length.

5. The stowing gooseneck belt clip of claim 1, wherein the base is removably connected to the gooseneck belt clip front plate.

6. The stowing gooseneck belt clip of claim 1, wherein the electronic device holder is removably connected to the second end of the gooseneck.

7. The stowing gooseneck belt clip of claim 6, wherein the electronic device holder is removably connected to the second end of the gooseneck opposite the base via an electronic device holder release unit.

8. The stowing gooseneck belt clip of claim 1, wherein the electronic device holder is comprised of three securing structures on three sides of the electronic device holder, which securing structures hold the electronic device to the electronic device holder.

\* \* \* \* \*